(12) United States Patent
Casper et al.

(10) Patent No.: US 11,995,531 B1
(45) Date of Patent: *May 28, 2024

(54) NEURAL NETWORK CHIP FOR EAR-WORN DEVICE

(71) Applicant: Chromatic Inc., New York, NY (US)

(72) Inventors: Andrew Casper, Eau Claire, WI (US); Matthew de Jonge, Brooklyn, NY (US); Igor Lovchinsky, New York, NY (US); Nicholas Morris, Brooklyn, NY (US); Jonathan Macoskey, Pittsburgh, PA (US)

(73) Assignee: Chromatic Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,730

(22) Filed: Jan. 12, 2024

Related U.S. Application Data

(63) Continuation of application No. 18/232,854, filed on Aug. 11, 2023, now Pat. No. 11,886,974.
(Continued)

(51) Int. Cl.
*G06F 7/544* (2006.01)
*G06F 9/50* (2006.01)
(Continued)

(52) U.S. Cl.
CPC ........... *G06N 3/044* (2023.01); *G06F 7/5443* (2013.01); *G06F 9/5016* (2013.01); *H04R 25/507* (2013.01)

(58) Field of Classification Search
None
See application file for complete search history.

(56) References Cited

U.S. PATENT DOCUMENTS 10,504,022 B2 * 12/2019 Temam ................ G06N 3/063
11,330,378 B1 * 5/2022 Jelčicová et al. .... H04R 25/507
(Continued)

FOREIGN PATENT DOCUMENTS

JP         2001117900 A      4/2001

OTHER PUBLICATIONS

K. Ando, et al., "BRein Memory: A Single-Chip Binary/Ternary Reconfigurable in-Memory Deep Neural Network Accelerator Achieving 1.4 TOPS at 0.6 W", IEEE Journal of Solid-State Circuits, pp. 983-994, vol. 53, No. 4, Apr. 2018.
(Continued)

*Primary Examiner* — Nafiz E Hoque
(74) *Attorney, Agent, or Firm* — Shih IP Law Group, PLLC

(57) ABSTRACT

A hearing aid may include a neural network chip having tiles arranged in an array, each tile including memory, 16-128 multiplier-accumulator circuits (MACs), and routing circuitry. The memory of each tile may be configured to store a portion of elements of a matrix A comprising weights of a recurrent neural network. Each tile may be configured to receive and store elements of an activation vector X, and all tiles in a column of the array may be configured to receive the same elements of X. The plurality of tiles may be configured to perform a matrix-vector multiplication A*X by performing multiply-and-accumulate sub-operations in parallel among the plurality of tiles. The routing circuitry
(Continued)

from the tiles in each respective row of tiles may be configured to combine results of the multiply-and-accumulate sub-operations.

20 Claims, 8 Drawing Sheets

Related U.S. Application Data

(60) Provisional application No. 63/514,641, filed on Jul. 20, 2023.

(51) Int. Cl.
*G06N 3/044* (2023.01)
*H04R 25/00* (2006.01)

(56) References Cited

U.S. PATENT DOCUMENTS

| | | | |
|---|---|---|---|
| 2018/0129933 A1* | 5/2018 | Wang | G06N 3/044 |
| 2022/0027152 A1* | 1/2022 | Ware | G06F 9/3001 |
| 2022/0172052 A1* | 6/2022 | Bunandar | G06N 3/084 |
| 2022/0405598 A1* | 12/2022 | Lichtenau | G06N 3/0442 |

OTHER PUBLICATIONS

"GAP9 Next Generation Processor for Hearables and Smart Sensors", Greenwaves Technologies, 2021, 2 pages.
E. Nurvitadhi, et al, "Accelerating Binarized Neural Networks: Comparison of FPGA, CPU, GPU, and ASIC", 2016 IEEE, 8 pages.
E. Nurvitadhi, et al., "Hardware Accelerator for Anayltics of Sparse Data", Intel Corp., pp. 1616-1621, 2016, Design, Automation & Test in Europe Conference & Exhibition.
F. Conti, et al., "A Ultra-Low-Energy Convolution Engine for Fast Brain-Inspired Vision in Multicore Clusters", pp. 683-688, 2015, Design, Automation & Test in Europe Conference & Exhibition.
C. Zhang, et al., "Optimizing FPGA-based Accelerator Design for Deep Convolution Neural Networks", pp. 161-170, FPGA'15, Feb. 22-24, 2015, Monterey California, CA, ACM.
K. Siu, "Reducing Off-Chip Memory Accesses in Deep Neural Network Accelerators", 2019, 63 pages.
J. Li, et al., "CSCNN: Algorithm-hardware Co-design for CNN Accelerators using Centrosymmetric Filters", 14 pages.
K. Kiningham, et al., "Design and Analysis of a Hardware CNN Accelerator", 8 pages.
Supervisor Prof. Mihai Teodor Lazarescu and Candidate Andrea Andrea Casale, "FPGA-based Deep Learning Inference Acceleration at the Edge", 2020-2021, Master Degree Thesis, 100 pages.
T. Chen, et al., "DianNao a Small-Footprint High-Throughput Accelerator for Ubiquitous Machine-Learning", ASPLOS'14, Mar. 1-5, 2014, ACM, pp. 269-283.
V. Sze, et al., "Efficient Processing of Deep Neural Networks: A Tutorial and Survey", vol. 105, No. 12, Dec. 2017, Proceeding of the IEEE, pp. 2295-2329.
M. Capra, et al., "An Updated Survey of Efficient Hardward Architectures for Accelerating Deep Convolutional Neural Networks", Future Internet 2020, 12, 113, 22 pgs.

* cited by examiner

NEURAL NETWORK CHIP FOR EAR-WORN DEVICE

CROSS-REFERENCE

This application is a Continuation of U.S. Ser. No. 18/232,854, filed Aug. 11, 2023, which claims priority to U.S. Provisional Application No. 63/514,641, filed Jul. 20, 2023, which are incorporated herein by reference.

BACKGROUND

Field

The present disclosure relates to a neural network chip for an ear-worn device, such as a hearing aid.

Related Art

Hearing aids are used to help those who have trouble hearing to hear better. Typically, hearing aids amplify received sound. Some hearing aids attempt to remove environmental noise from incoming sound.

SUMMARY

According to one aspect, a hearing aid includes a neural network chip including a plurality of tiles arranged in an array, each tile including memory, multiplier-accumulator circuits (MACs), and routing circuitry. Each tile includes between or equal to 16-128 MACs. The memory of each tile is configured to store a portion of elements of a matrix A including weights of a recurrent neural network. Each tile is configured to receive and store elements of the vector X, where X is an activation vector derived from an input audio signal. All or a subset of the plurality of tiles are configured to perform a matrix-vector multiplication A*X by performing multiply-and-accumulate sub-operations in parallel among all or the subset of the plurality of tiles. The routing circuitry from the tiles in each respective row of tiles is configured to combine results of the multiply-and-accumulate sub-operations All tiles in a column of the array are configured to receive same elements of X.

In some embodiments, the memory and multiplier-accumulator circuitry of any given tile is disposed within an area no larger than 0.25 mm^2.

In some embodiments, a given tile is configured to reuse an element of X across all calculations performed by multiplier-accumulator circuitry in the tile on a given clock cycle. In some embodiments, a given tile is configured to simultaneously fan out a single element of the activation vector X from the memory to each of the MAC circuits in the given tile. In some embodiments, all tiles in a column of the tile array are coupled to a vector memory only by a single, shared bus. In some embodiments, the array lacks independent connections between adjacent tiles in a column. In some embodiments, a tile in the column lacks capability to output data to another tile in the column. In some embodiments, the neural network chip lacks capability to transmit different elements of X to different tiles in a column.

In some embodiments, all memory on the neural network chip together includes no more than approximately 40 Mbits of memory for weights of the recurrent neural network.

In some embodiments, the neural network chip is approximately equal to or between 9-14 mm^2 in area. In some embodiments, the neural network chip is approximately equal to or less than 20 mm^2 in area.

In some embodiments, the neural network chip further includes a plurality of bias circuits, each bias circuit electrically coupled with one row of the plurality of tiles and including bias memory and routing circuitry, each of the plurality of bias circuits is configured to receive and store one or more biases in the bias memory, and the routing circuitry from the tiles in each respective row of tiles and routing circuitry from a bias circuit electrically coupled with each respective row of tiles are configured to combine the results of the multiply-and-accumulate sub-operations with biases.

In some embodiments, the neural network chip further includes short-time Fourier transform (STFT) and inverse short-time Fourier transform (iSTFT) circuitry configured to perform STFT on audio signals coming from off-chip and iSTFT on audio signals going off-chip, respectively. In some embodiments, the activation vector X for a first layer of the recurrent neural network is a result of processing an audio signal coming from off-chip with the STFT circuitry.

In some embodiments, the recurrent neural network is configured to perform de-noising of audio signals.

In some embodiments, the neural network chip is configured to disable a subset of tiles within the tile array. In some embodiments, the neural network chip is configured to disable the subset of the tiles within the tile array based on sizes of the weight matrix A and/or the activation vector X. In some embodiments, the neural network chip is configured to disable the subset of tiles within the tile array when estimating a signal-to-noise ratio (SNR) of an incoming signal. In some embodiments, the neural network chip is configured to estimate the SNR of the incoming signal with one tile. In some embodiments, the neural network chip is configured to select the subset of tiles within the tile array to disable based on a target amount of de-noising to be provided by the neural network.

According to one aspect, a neural network chip includes a plurality of tiles arranged in an array, each tile including memory, multiplier-accumulator circuits (MACs), and routing circuitry. Each tile includes between or equal to 16-128 MACs. The memory of each tile is configured to store a portion of elements of a matrix A including weights of a recurrent neural network. Each tile is configured to receive and store elements of the vector X, where X is an activation vector derived from an input audio signal. All or a subset of the plurality of tiles are configured to perform a matrix-vector multiplication A*X by performing multiply-and-accumulate sub-operations in parallel among all or the subset of the plurality of tiles. The routing circuitry from the tiles in each respective row of tiles is configured to combine results of the multiply-and-accumulate sub-operations All tiles in a column of the array are configured to receive same elements of X.

In some embodiments, the memory and multiplier-accumulator circuitry of any given tile is disposed within an area no larger than 0.25 mm^2.

In some embodiments, a given tile is configured to reuse an element of X across all calculations performed by multiplier-accumulator circuitry in the tile on a given clock cycle. In some embodiments, a given tile is configured to simultaneously fan out a single element of the activation vector X from the memory to each of the MAC circuits in the given tile. In some embodiments, all tiles in a column of the tile array are coupled to a vector memory only by a single, shared bus. In some embodiments, the array lacks independent connections between adjacent tiles in a column.

In some embodiments, a tile in the column lacks capability to output data to another tile in the column. In some embodiments, the neural network chip lacks capability to transmit different elements of X to different tiles in a column.

In some embodiments, all memory on the neural network chip together includes no more than approximately 40 Mbits of memory for weights of the recurrent neural network.

In some embodiments, the neural network chip is approximately equal to or between 9-14 mm^2 in area. In some embodiments, the neural network chip is approximately equal to or less than 20 mm^2 in area.

In some embodiments, the neural network chip further includes a plurality of bias circuits, each bias circuit electrically coupled with one row of the plurality of tiles and including bias memory and routing circuitry, each of the plurality of bias circuits is configured to receive and store one or more biases in the bias memory, and the routing circuitry from the tiles in each respective row of tiles and routing circuitry from a bias circuit electrically coupled with each respective row of tiles are configured to combine the results of the multiply-and-accumulate sub-operations with biases.

In some embodiments, the neural network chip further includes short-time Fourier transform (STFT) and inverse short-time Fourier transform (iSTFT) circuitry configured to perform STFT on audio signals coming from off-chip and iSTFT on audio signals going off-chip, respectively. In some embodiments, the activation vector X for a first layer of the recurrent neural network is a result of processing an audio signal coming from off-chip with the STFT circuitry.

In some embodiments, the recurrent neural network is configured to perform de-noising of audio signals.

In some embodiments, the neural network chip is configured to disable a subset of tiles within the tile array. In some embodiments, the neural network chip is configured to disable the subset of the tiles within the tile array based on sizes of the weight matrix A and/or the activation vector X. In some embodiments, the neural network chip is configured to disable the subset of tiles within the tile array when estimating a signal-to-noise ratio (SNR) of an incoming signal. In some embodiments, the neural network chip is configured to estimate the SNR of the incoming signal with one tile. In some embodiments, the neural network chip is configured to select the subset of tiles within the tile array to disable based on a target amount of de-noising to be provided by the neural network.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
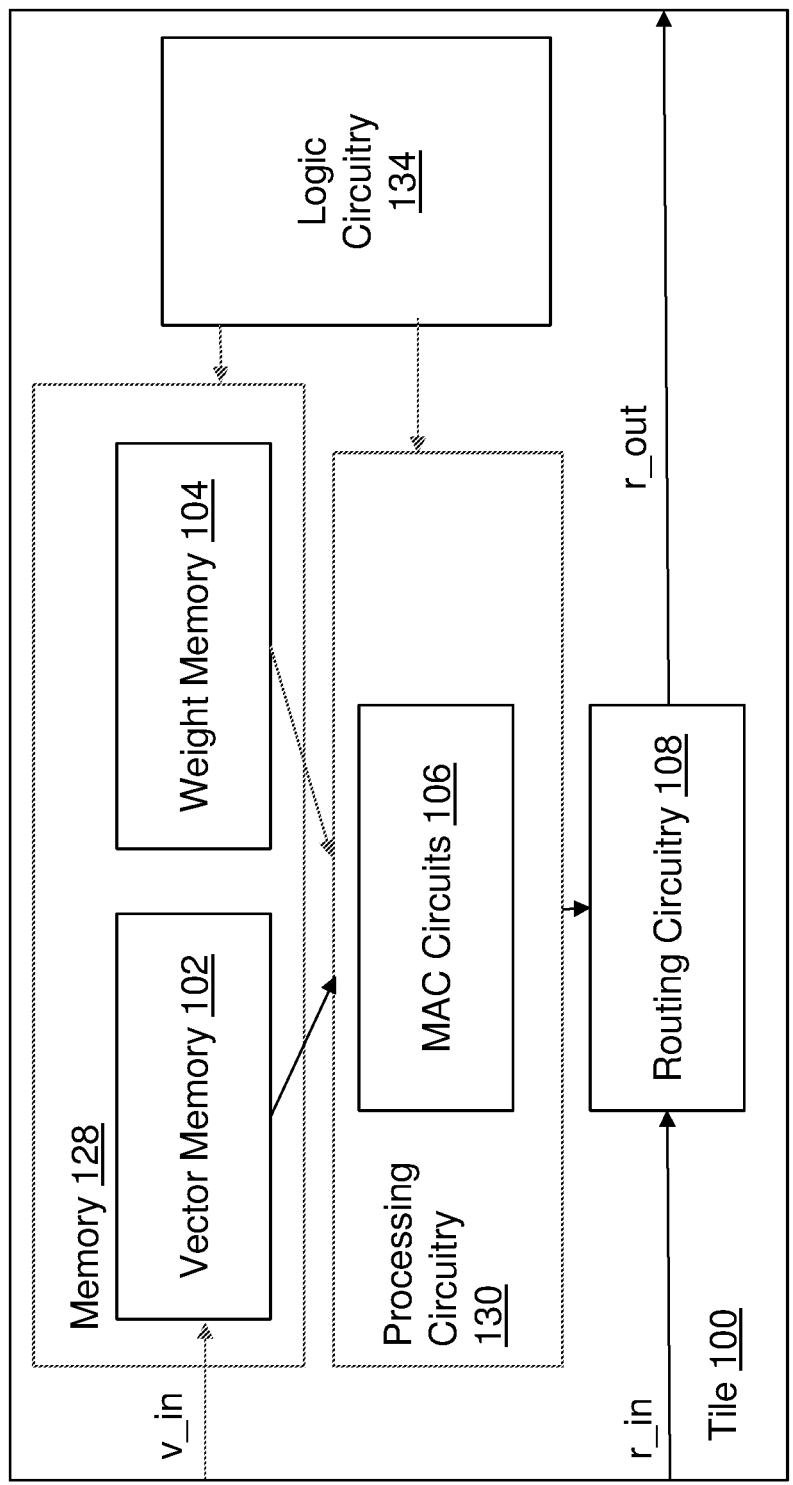
FIG. 1 illustrates a tile, in accordance with certain embodiments described herein.

Wearers of ear-worn devices (e.g., hearing aids or cochlear implants) typically have hearing deficiencies. While conventional ear-worn devices may be used to amplify sound, they may not be configured to distinguish between target sounds and non-target sounds and/or selectively process components of detected audio. Neural network-based audio enhancement techniques may be employed to address such deficiencies of conventional ear-worn device technology.

Deploying audio enhancement techniques introduces delays between when a sound is emitted by the sound source and when the enhanced sound is output to a user. For example, such techniques may introduce a delay between when a speaker speaks and when a listener hears the enhanced speech. During in-person communication, long latencies can create the perception of an echo as both the original sound and the enhanced version of the sound are played back to the listener. Additionally, long latencies can interfere with how the listener processes incoming sound due to the disconnect between visual cues (e.g., moving lips) and the arrival of the associated sound.

Conventional approaches for incorporating neural networks into signal processors of hearing aids involve allocating a fixed number of processors to run the neural network. The inventors have recognized that, to attain tolerable latencies when implementing a neural network on an ear-worn device, the ear-worn device would need to be capable of performing billions of operations per second. Conventional approaches for attaining such a processing speed involve either increasing the clock frequency of the processors or increasing the total number of processors used to implement the neural network. However, the inventors have recognized disadvantages associated with both approaches.

First, increasing clock frequency requires an increase in the voltage provided to the processors. This results in increased power consumption, which shortens the battery life of the device. Power consumption may increase because, first, power consumption is proportional to f*v^2 (where f is clock frequency and v is voltage). Additionally, the size of logic elements required to support higher frequencies may also increase power consumption. Prospective wearers of such a device would bear the burden of the reduced battery life by needing to frequently replace or recharge the battery. Furthermore, while increasing the size of the battery may help to extend battery life, it would increase the weight of the ear-worn device, which would cause discomfort to the wearer.

Second, increasing the number of processors results in those processors being physically spread out on the chip. This poses challenges to implementing speech and audio enhancement algorithms, such as recurrent neural networks (RNNs), for example. Such algorithms enhance a currently received audio signal using recently received information.

Unlike other neural networks, such as convolutional neural networks, such algorithms very rarely reuse data. As a result, executing such an algorithm involves constantly reading in weights (i.e., the parameters of the neural network model) from memory, which contributes to power consumption and latency. This issue is exacerbated when processors are physically spread out on the chip, because more power is consumed when moving data between memory and distant processors across power-consuming buses.

Accordingly, the inventors have developed methods and apparatus that address the above-described challenges of conventional neural network-based audio enhancement techniques and hearing aid technology. In some embodiments, the method and apparatus include an ear-worn device (e.g., a hearing aid or a cochlear implant) having a neural network chip configured to implement a recurrent neural network model for denoising an audio signal.

In some embodiments, the neural network chip includes substantially identical circuitry tiles. FIG. 1 illustrates a tile 100, in accordance with certain embodiments described herein. The tile 100 may be one of a plurality of tiles in the neural network chip. Each tile 100 of the plurality of tiles includes memory 128, processing circuitry 130, routing circuitry 108, and logic circuitry 134. The memory 128 includes vector memory 102 and weight memory 104. The processing circuitry 130 includes multiplier-accumulator (MAC) circuits 130. An input v_in to the tile 100 couples to an input to the vector memory 102. An input r_in to the tile 100 couples to an input to the routing circuitry 108. An output r_out from the tile 100 couples to an output from the routing circuitry 108. Outputs of the vector memory 102 and weight memory 104 couple to inputs to the processing circuitry 130. Outputs from the processing circuitry 130 couple to inputs to the routing circuitry 108. The logic circuitry 134 is coupled to the memory 128 and the processing circuitry 130, and the logic circuitry 134 is configured to control their operation. As illustrated, the memory 128 and the processing circuitry 130 are disposed locally within each tile 100. In some embodiments, this may mean that the distance from the memory 128 of any given tile 100 to the processing circuitry 130 of that tile may be smaller than the distance from that memory 128 to the processing circuitry 130 of another tile 100. In some embodiments, the memory 128 and the processing circuitry 130 of any given tile 100 may be disposed within an area no larger than 0.125 mm^2. In some embodiments, the memory 128 and the processing circuitry 130 of any given tile 100 may be disposed within an area no larger than 0.15 mm^2. In some embodiments, the memory 128 and the processing circuitry 130 of any given tile 100 may be disposed within an area no larger than 0.175 mm^2. In some embodiments, the memory 128 and the processing circuitry 130 of any given tile 100 may be disposed within an area no larger than 0.2 mm^2. In some embodiments, the memory 128 and the processing circuitry 130 of any given tile 100 may be disposed within an area no larger than 0.225 mm^2. In some embodiments, the memory 128 and the processing circuitry 130 of any given tile 100 may be disposed within an area no larger than 0.25 mm^2. These area numbers may be based, at least in part, on the size of the memory 128 within the tile 100, and how many instances of memory 128 exist within the tile. As will be discussed below, memories may become inefficient beyond a certain size. The number of instances of memory 128 in a tile 100 may depend on how many instances can be efficiently controlled by logic circuitry 134, as will be described below.

The weight memory 104 of a particular tile 100 may store weights of the neural network (e.g., weights corresponding to at least a portion of a layer of the neural network). The vector memory 102 of a particular tile 100 may store one or more elements of an activation vector. Collocating the memory 128 with the processing circuitry 130 in this manner may reduce the power consumption associated with moving data from distant memories to processing circuitry that may be physically spread out over a conventional chip. Thus, the processing circuitry 130 may efficiently retrieve the weights needed to perform the operations. Accordingly, the methods and apparatus developed by the inventors may avoid the costly power consumption associated with frequently moving substantial amounts of data between distant memory and the processing circuitry.

The neural network chip developed by the inventors may strike a balance between (a) reducing power consumption associated with moving data between the processing circuitry and distant memory separate from the processing circuitry, and (b) reducing inefficiencies associated with the size of memories on the chip. Each tile 100 may include one or more memories 128 (e.g., 1, 2, 3, 4, 5, 6, etc.), each of which is collocated with one or more instances of processing circuitry 130 (e.g., 1, 2, 4, 6, 8, 10, 12, 14, 16, 18, 20, 24, 28, 32, etc.). The inventors have recognized that, in some embodiments, it may be advantageous to collocate more than one instance of processing circuitry 130 with each memory 128 to reduce inefficiencies associated with the size of memory on the chip. For example, larger memories are more efficient than smaller memories, but they occupy more space than smaller memories. Therefore, due to the size constraints of the neural network chip, it may be inefficient to place a single instance of processing circuitry 130 with each relatively large memory. Accordingly, placing a limited number of instances of processing circuitry 130 with each memory 128 (where multiple instances of processing circuitry 130 coupled with a memory 128 may be considered a "core") may take advantage of the efficiencies associated with larger memories, and abide by the size constraints of the neural network chip, without compromising the efficiencies associated with collocating memory 128 with processing circuitry 130. Additionally, in some embodiments, the memory 128 may be single-ported memory, meaning that only one address can be read at a time. A single-ported memory may save space and power compared with, for example, a dual-ported memory, which may be twice as big as a single-ported memory and consume more than twice as much power. Once memory increases beyond a certain size, the efficiency of gain from increasing memory size may be largely negligible. In particular, there may be a gain in power-area per bit when increasing from, for example, a 32×32 memory to a 128×512 memory, but not nearly as large a gain when increasing from 128×512 to 128×8192. Thus, when using more than one small memories, for example 4, in a tile 100 rather than one large memory, there may be a small decrease in efficiency, but a large increase (in this example, 4 times) in read bandwidth as it is possible to read from multiple (in this example, 4) different addresses at once.

As illustrated, each tile 100 of the neural network chip further includes logic circuitry 134 for configuring and controlling the processing circuitry 130 and memory 102 located on the tile 100. Since the logic circuitry 134 does not contribute to the computation required to implement the recurrent neural networks, the inventors have recognized that it may be beneficial to minimize the area and power consumption by the logic circuitry 134. Accordingly, in some embodiments, the tiles 100 developed by the inventors include logic circuitry 134 that is used to control more than one grouping of memory 128 and processing circuitry 130. For example, a particular tile 100 may include logic circuitry 134 configured to control multiple (e.g., 1, 2, 3, 4, 5, 6, etc.) cores of memory 128 and the processing circuitry 130 associated with that memory 128.

In some embodiments, the number of tiles 100 in a tile array may be between or equal to 2-64, 2-32, 2-16, 4-64, 4-32, 4-16, 8-64, 8-32, 8-16, 16-64, or 16-32. For example, there may be 16 tiles 100, which may be arranged in a 4×4 tile array. In some embodiments, the number of MAC circuits 106 in a tile 100 may be between or equal to 16-256, 16-128, 16-64, 32-256, 32-128, 32-64, 64-256, or 64-128. In some embodiments, the number of MAC circuits 106 in a tile 100 may be 64. As one non-limiting example, a tile 100 may include 64 instances of processing circuitry 130, each of which includes a MAC circuit 106. These may be implemented, for example, as 4 cores, each including one instance of memory 128 and 16 instances of processing circuitry 130. Such a tile 100 may be configured to compute 64 multiply-accumulate operations in parallel.

In operation, the tile 100 may be configured to use the MAC circuits 106 to multiply an activation vector element received from the vector memory 102 with a weight received from the weight memory 104, and add the product to a running sum. The weights in the weight memory 104 may be continuously stored on the chip; in other words, they may not need to be retrieved from a memory off-chip every time a computation with the weights is performed. They may originally be loaded from an external memory (e.g., an EEPROM) in the device (e.g., the car-worn device) in which the chip is disposed when the device is booted up. This external memory may be configured, when updates to the weights are available, to receive the updated weights over a wireless connection (e.g., BLUETOOTH) and load the updated weights by rebooting the device.

Figure 2:
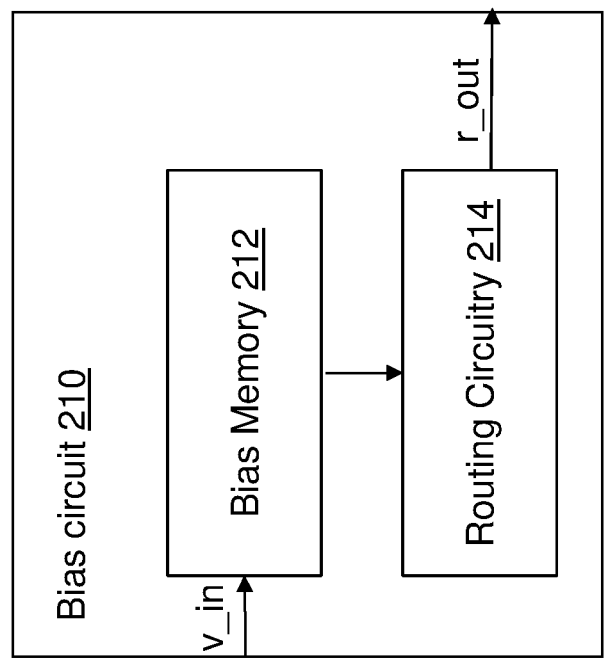
FIG. 2 illustrates a bias circuit, in accordance with certain embodiments described herein.

FIG. 2 illustrates a bias circuit 210, in accordance with certain embodiments described herein. The bias circuit 210 includes bias memory 212 and routing circuitry 214. The bias circuit 210 has an input v_in coupled to an input of the bias memory 212. The bias circuit 210 has an output r_out coupled to an output of the routing circuitry 214. An output of the bias memory 212 is coupled to an input of the routing circuitry 214. The bias memory 212 of each bias circuit 210 may be configured to store one or more biases.

Figure 3:
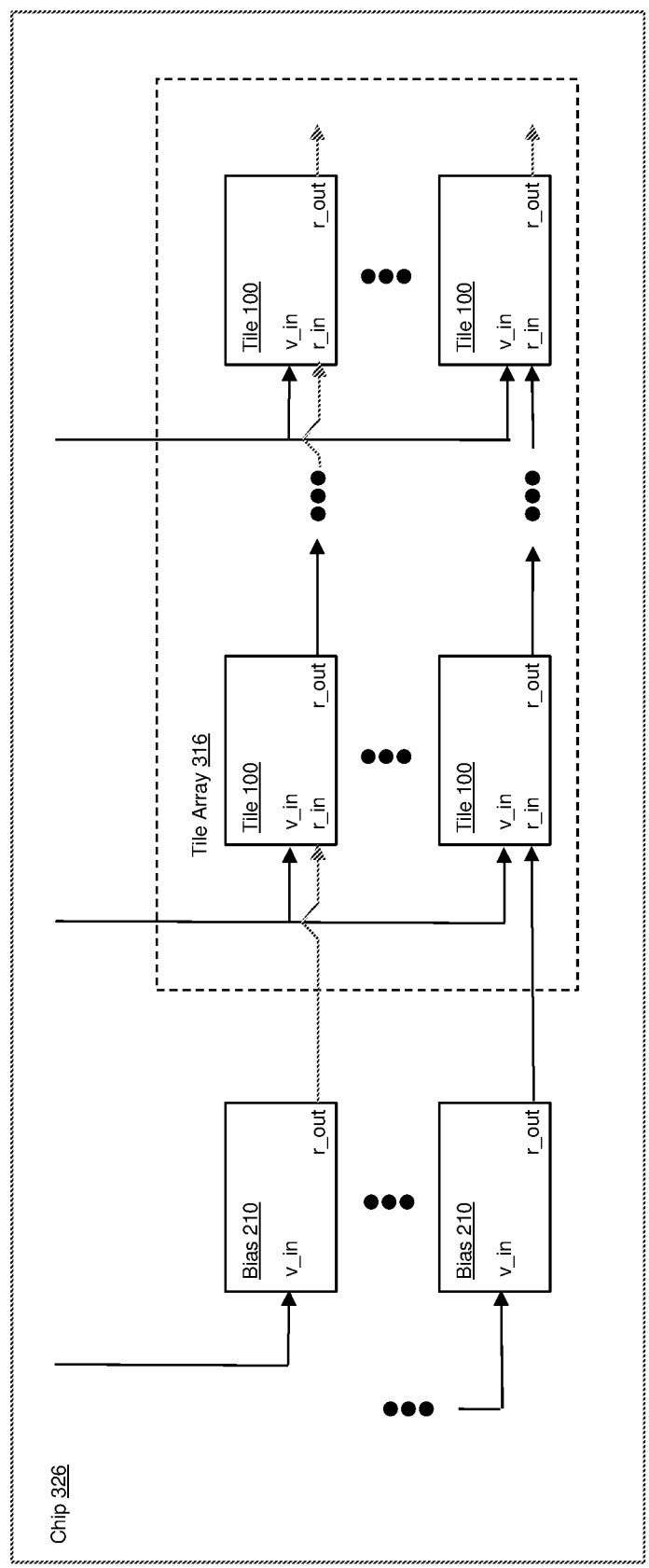
FIG. 3 illustrates circuitry on a neural network chip, in accordance with certain embodiments described herein.

FIG. 3 illustrates circuitry on a neural network chip 326, in accordance with certain embodiments described herein. The neural network chip 326 includes multiple instantiations of the tile 100 illustrated in FIG. 1 and the bias circuit 210 illustrated in FIG. 2. The tiles 100 are arranged electrically in a tile array 316 having rows and columns. There may be fewer bias circuits 210 than tiles 100, for example, one bias circuit 210 electrically coupled with tiles 100 in one row. All the circuitry illustrated in FIG. 3 may be implemented on a single chip, in other words, a single semiconductor substrate/die.

The tiles 100 of the neural network chip 326 may be configured to operate in combination with one another to implement a recurrent neural network. The recurrent neural network may include one or more layers. In some embodiments, implementing the recurrent neural network may include computing one or more matrix-vector operations (e.g., multiplications) for each of the one or more layers of the recurrent neural network. For example, a matrix-vector multiplication may be computed between an activation vector and a matrix of weights of the recurrent neural network.

A matrix-vector multiplication may be, for example, AX=Y, where A is a matrix including weights of the recurrent neural network, X is an activation vector, and Y is a result. An activation vector X may be derived from an input audio signal. For example, the activation vector X for the first layer may be the result of processing the result of a short-time Fourier transform (STFT) of a digitized audio signal. Each vector Y (i.e., the result of processing an activation vector X using the recurrent neural network with the weights in A) may be the input (i.e., the vector X) to a subsequent layer, or may be used to form the input (i.e., the vector X) to a subsequent layer. As will be described in further detail, a matrix-vector multiplication may be broken up into multiply-and-accumulate sub-operations in parallel. Thus, in some embodiments, a subset or all of the tiles 100 of the neural network chip 326 may operate in combination to compute a particular matrix-vector multiplication of a recurrent neural network. For example, each tile 100 in a subset of the tile array 316, or all tiles 100 in the tile array 316, may be configured to perform multiply-and-accumulate sub-operations (using the MAC circuits 106) in parallel among all the plurality of tiles 100, and the neural network chip 326 may combine results of the multiply-and-accumulate sub-operations to produce a result of the matrix-vector multiplication.

Figure 4:
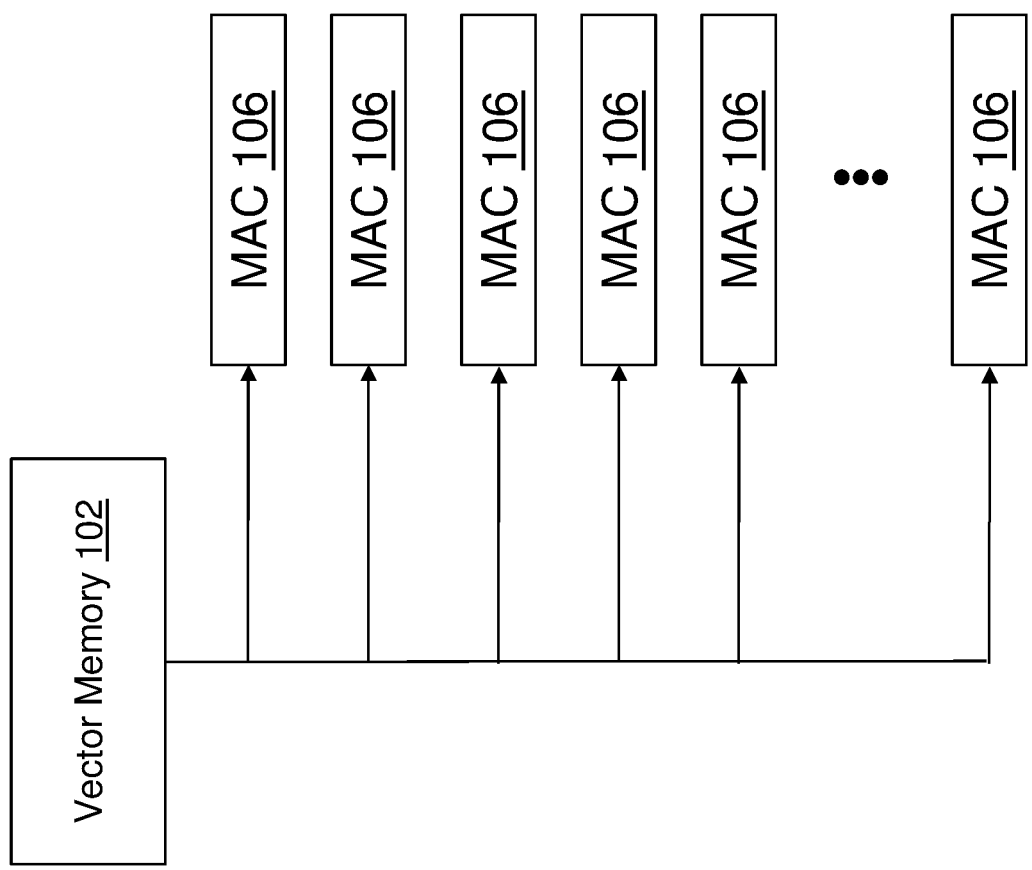
FIG. 4 illustrates how a single element X may simultaneously (e.g., on a single clock cycle) be fanned out from the vector memory to each of the MACs in a tile, using direct parallel paths, in accordance with certain embodiments described herein.

As illustrated in FIG. 3, each tile 100 may be configured to receive and store elements of the vector X in the vector memory 102 in the tile 100. Elements of the activation vector X may be broadcast down columns of tiles 100 in the tile array 316 (to the inputs v_in); in other words, each tile 100 in a column may receive the same elements of X. In some embodiments, the chip 326 may lack the capability to transmit different elements of X to different tiles in a column; this lack of flexibility may help to reduce power consumption and/or area of the chip 326. The elements of X may be stored near the processing circuitry 130 in the tile 100, such that little data movement is required for the weights. Reducing data movement may reduce power consumption. The tile 100 may then simultaneously fan out a single element X to all MACs 106 within a tile 100 for calculations during a single clock cycle. Thus, a single element of X may be reused across all MACs 106 in a tile 100 in calculations performed on a single clock cycle. FIG. 4 illustrates how a single element X may simultaneously (e.g., on a single clock cycle) be fanned out from the vector memory 102 to each of the MACs 106 in a tile, using direct parallel paths, in accordance with certain embodiments described herein. The inventors have recognized that moving vectors between tiles and a separate memory contributes to overall power consumption. Accordingly, in an effort to reduce the overall power consumption, instead of retrieving an activation vector for each vector-by-vector operation (e.g., for each row of the matrix vector operation), the activation vector may be retrieved from the vector memory 320 a single time and reused. Each bias circuit 210 may be configured to receive and store biases in the bias memory 212.

As illustrated, the routing circuitry 108 of all tiles 100 in a row and the routing circuitry 214 of a row's bias circuit 210 may electrically couple together all the tiles 100 in the row and the row's bias circuit 210. The routing circuitry 108 and the routing circuitry 214 may be configured to combine the results of the tiles' 100 multiply-and-accumulate calculations together with biases.

The following description describes in more detail how tiles may be configured to do calculations for a matrix-vector multiplication plus bias Y=Ax+b in parallel. The following illustrates a matrix-vector multiplication, together with a sum of a bias b:

$$Ax + b = \begin{bmatrix} a1,1 & a1,2 & \cdots & a1,n \\ a2,1 & a2,2 & \cdots & a2,n \\ \vdots & \vdots & \vdots & \vdots \\ am,1 & am,2 & \cdots & am,2 \end{bmatrix} \begin{bmatrix} x1 \\ x2 \\ \vdots \\ xn \end{bmatrix} + \begin{bmatrix} b1 \\ b2 \\ \vdots \\ bm \end{bmatrix} =$$

$$\begin{bmatrix} a1,1 \times x1 + a1,2 \times x2 + \ldots + a1, n \times xn + b1 \\ a2,1 \times x1 + a2,2 \times x2 + \ldots + a2, n \times xn + b2 \\ \ldots \\ am,1 \times x1 + am,2 \times x2 + \ldots + am, n \times xn + bm \end{bmatrix}$$

Figure 5:
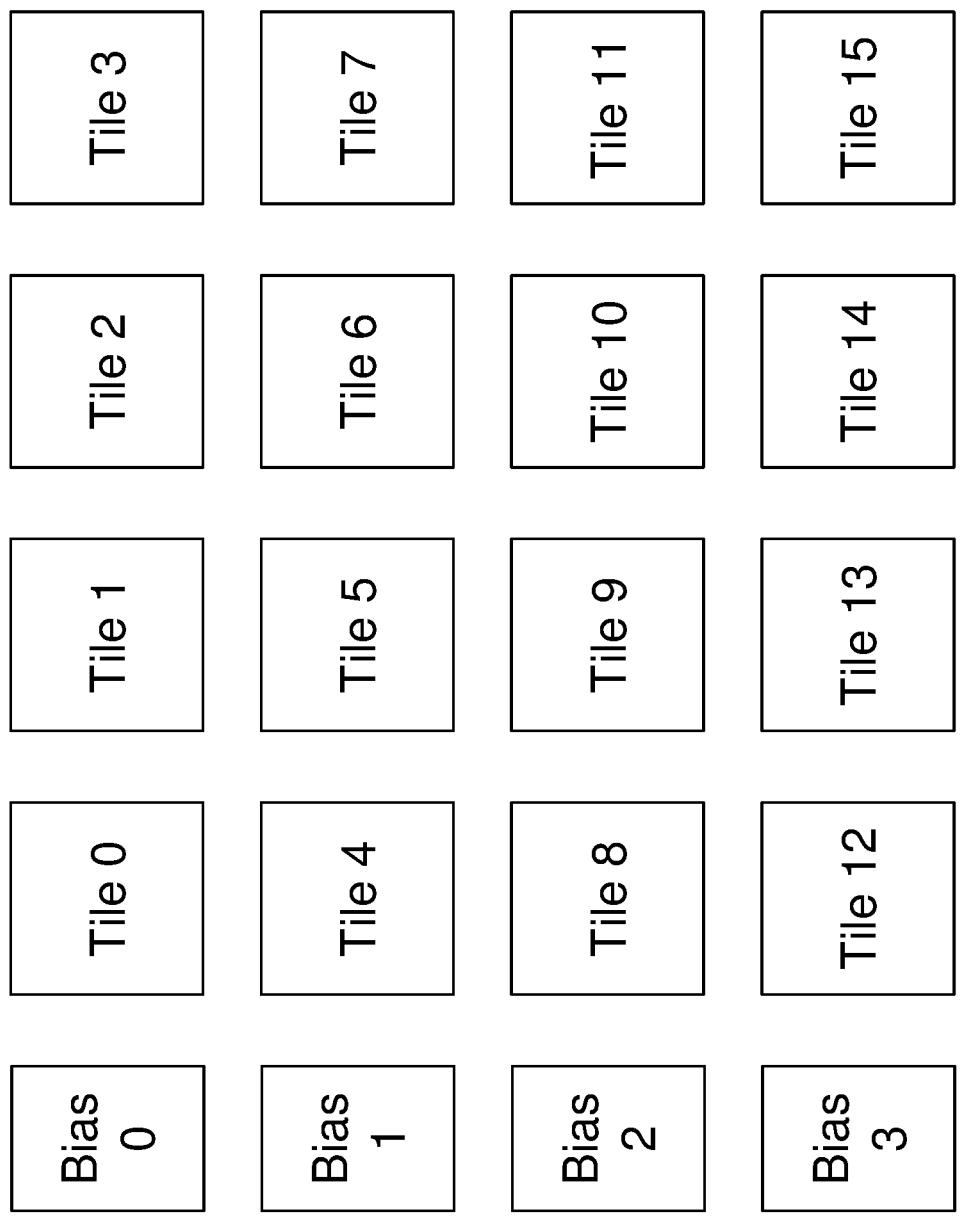
FIG. 5 illustrates a tile array, in accordance with certain embodiments described herein.

FIG. 5 illustrates a tile array, in accordance with certain embodiments described herein. The tile array of FIG. 5 may be the same as the tile array 316. Assume m=256 and n=256 and the tile array as illustrated in FIG. 5. Tiles 0, 4, 8, and 12 may receive the elements x1-x64 of the activation vector, tiles 1, 5, 9, and 13 may receive x65-x128, etc. The bias circuit 0 may receive biases b1-b64, the bias circuit 1 may receive biases b65-b128, etc. On a first clock cycle, Tile 0 may use its 64 MAC circuits 106 to calculate the following products: a1,1*x1; a2,1*x1; . . . ; a64,1*x1. It can be appreciated that each MAC circuit 106 uses the same element of the activation vector (in this case, x1) on a single clock cycle. On a second clock cycle, Tile 0 may use its 64 MACs 106 to calculate the following products: a1,2*x2; a2,2*x2; . . . ; a64,2*x2. On this clock cycle, Tile 0 may accumulate these products with the products from the previous clock cycle to produce a1, 1*x1+a1,2*x2; a2,1*x1+ a2,2*x2; . . . ; a64,1*x1+a64,2*x2. After 64 clock cycles, Tile 0 may have calculated the following: a1,1*x1+a1, 2*x2+ . . . +a1,64*x64; a2, 1*x1+a2,2*x2+ . . . +a2,64* x64; . . . ; a64,1*x1+a64,2*x2+ . . . +a64,64*x64. Tile 0 may locally store the following weights for use in these calculations: a1,1; a1,2; . . . ; a1,64; a2,1; a2,2; . . . a64,64.

In a similar vein, after 64 clock cycles, Tile 1 may have calculated the following: a1,65*x65+a1,66*x66+ . . . +a1, 128*x128; a2,65*x65+a2,66*x66+ . . . +a2, 128* x128; . . . ; a64,65*x65+a64,66*x66+ . . . +a64, 128*x128. The results from Tiles 0 and 1 may be combined together along with the results from tiles 2 and 3 and bias elements from bias circuit 0, and similarly for the other rows. The result from the first row of tiles may thus be a1,1*x1+a1, 2*x2+ . . . +a1,256*x256+b1; a2,1*x1+a2,2*x2+ . . . +a2, 256*x256+b2; . . . ; a64,1*x1+a64,2*x2+ . . . +a64, 256*x256+b64.

Figure 6:
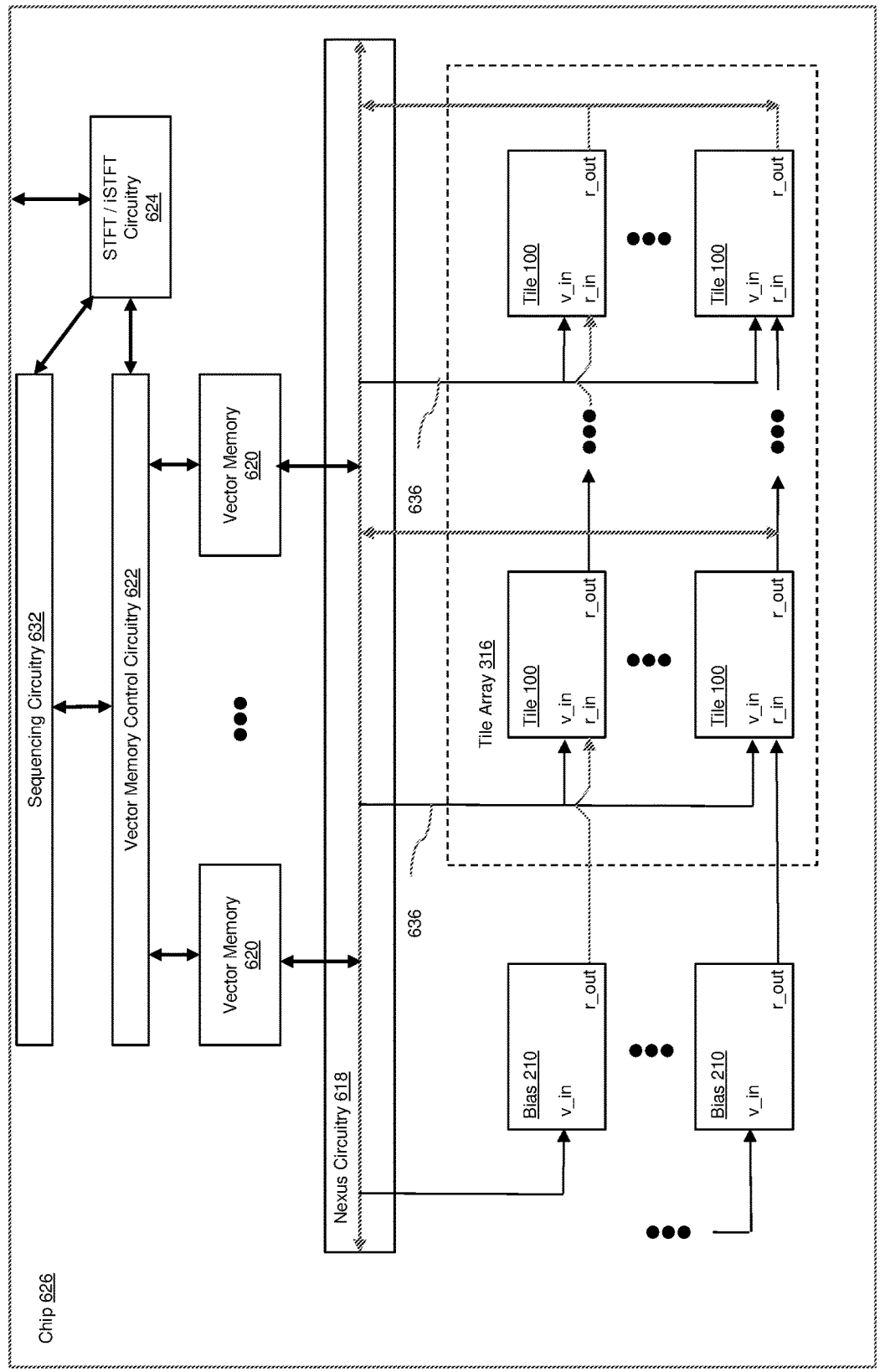
FIG. 6 illustrates circuitry in a neural network chip in more detail, in accordance with certain embodiments described herein.

FIG. 6 illustrates circuitry in a neural network chip 626 (which may be the same as the neural network chip 326) in more detail, in accordance with certain embodiments described herein. The neural network chip 626 further includes nexus circuitry 618, multiple instances of vector memory 620, vector memory control circuitry 622, STFT (short-time Fourier transform) and iSTFT (inverse short-time Fourier transform) circuitry 624, and sequencing circuitry 632. All the circuitry illustrated in FIG. 6 may be implemented on a single chip, in other words, a single semiconductor substrate/die.

The sequencing circuitry 632 may be configured to control the sequence of operations performed on the chip. The STFT and iSTFT circuitry 624 may be configured to perform STFT on incoming audio signals (i.e., audio signals coming from off-chip) and iSTFT on outgoing audio signals (i.e., audio signals going off-chip). In particular, the STFT and iSTFT circuitry 624 may be configured to receive audio signals from off-chip circuitry, such as circuitry configured to process (e.g., with amplification and/or filtering) and digitize analog audio signals received by microphones in an car-worn device, and perform STFT to convert the audio signals from time domain to frequency domain. The vector memory control circuitry 632 may be configured to control writing of data received from the STFT and iSTFT circuitry 624 to the vector memories 620.

The nexus circuitry 618 may be configured to interface between the vector memories 620, the bias circuits 210, and the tiles 100 in the tile array 316. Thus, the vector memory 102 of the tiles 100 may be configured to receive elements of activation vectors from the vector memory 620 through the nexus circuitry 618, and the bias memory 212 of each bias circuit 210 may be configured to receive one or more biases from the vector memory 620 through the nexus circuitry 618. As discussed above, each tile 100 in a column may receive the same elements of X from the vector memory 620. Thus, all tiles 100 in a column may be coupled to the vector memory 620 only by a single, shared bus 636, as illustrated in FIG. 6. In some embodiments, the chip 626 may lack the capability to transmit different elements of X to different tiles in a column. It should be appreciated that the vector memory 620 is distinct from the circuitry in the tile array 316.

Results from calculations performed by the tiles 100 and the bias circuits 210 may be routed back to the vector memory 620 through the nexus circuitry 618 for storage and, in some cases, used as an input for calculations representing a subsequent layer of the recurrent neural network. Data that has been processed by the full recurrent neural network may be routed, under control of the vector memory control circuitry 612, from the vector memory 620 to the STFT and iSTFT circuitry 624 where iSTFT may be performed to convert the data from frequency domain to time domain. The resulting signal may then be routed to a receiver for output as sound by the car-worn device. (In some embodiments, the STFT/iSTFT circuitry 624 may be implemented off-chip.)

As can be seen in the example of FIG. 6, in some embodiments, the tile array 316 may lack independent connections between adjacent tiles 100 in a column. In other words, there may not be any electrical connections that only connect two tiles in a column. Instead, all tiles 100 in a column may be electrically connected by a shared bus 636. In some embodiments, a tile 100 in a column may lack capability to output data (e.g., results of calculations) to another tile 100 in the column. This may be due to the lack of independent connections between adjacent tiles 100 in a column. In some embodiments, a tile 100 may only output data (e.g., results of calculations) to another data in the same row, using the routing circuitry 108. These features, while potentially reducing flexibility, may help to reduce power consumption and/or area of the chip 626.

The chip (e.g., the chip 326 and/or the chip 626) may be configured to disable a subset of tiles within the array into a low power state during calculations that do not require the full computational power of the tile array, for example, based on the sizes of the input matrices and vector (i.e., when performing matrix-vector multiplications with relatively smaller matrices and/or vectors). For instance, an array of 4×4 tiles could enable a 2×2 subset array of tiles while leaving the other 12 tiles in a disabled, low-power state saving 75% the power as compared to the operations of the full 4×4 array. Disabling a tile may include, for example, stopping a clock signal from being provided to the tile and/or putting memory in the tile into a sleep or shutdown state. This may be particularly attractive for signal chains where the overhead of neural network based speech enhancement is not always warranted, but where smaller networks need to be run at all times. For example, the signal chain might include a model that estimates the signal-to-noise ratio (SNR) of the incoming audio and then turn on and off the full network based on the estimated SNR. In this case, the SNR model can run on one tile of the chip while the other tiles can sit dormant, conserving power. In some embodiments, the chip may be configured to select a number of circuitry tiles to engage in dependence on a target amount of de-noising to be provided by the neural network; for example, more tiles may be used for more de-noising and fewer tiles may be used for less de-noising. The target amount of de-noising may be based on user input.

Generally, the neural network chip may be configured to run different neural networks (in addition to a neural network for de-noising) with different subsets of the tiles. For a given neural network, the size of the subset may depend on the size of the neural network (e.g., how many weights it uses). Some neural networks may use all the tiles in the array, while others may not use all the tiles in the array. As examples, the neural network chip may run a neural network for checking whether a voice matches the voice signature of a target speaker, and/or a neural network for estimating the direction of a given isolated voice.

One of the main metrics used to measure performance is #Ops/Power (e.g. TOPs/Watt or GOPs/milliWatt). In some embodiments the chip may achieve an efficiency of at least approximately 4 GOPs/milliwatt. A conventional tensor processing unit (TPU) may have a power efficiency of 4 TOPs/Watt, but only when the TPU is running at hundreds of TOPs, compared with the chip which may run at 10s of GOPs/sec, up to approximately 100 GOP/s. The efficiency metric of 4 TOPs/Watt may not be valid when the TPU is running at less than 100 GOPs/sec because the TPU has a large fixed power cost associated with it. That fixed cost would dominate the overall power, greatly reducing the efficiency. Even "low-power" accelerators are often designed to run on a phone and consume 100s of mW to Watts of power. One cannot run a small model on those accelerators and achieve a power target of, for example, 1-2 mW.

As described above, the chip architecture and operation described herein may enable low power operation. In some embodiments, for a model having up to 10M 8-bit weights, and when operating at 100 GOPs/sec on time series data, the whole chip may achieve power efficiency of 4 GOPs/milliwatt and latency of NumOps/OpsPerSecond+~10 us. This may be measured at 40 degrees Celsius, when the chip uses supply voltages between 0.5-1.8V, and when the chip is performing operations without idling. In some embodiments, the number of operations per second required by a recurrent neural network trained for de-noising an input audio signal and implemented on the chip may result in power consumption no larger than 2 mW. In some embodiments, the number of operations per second required by a recurrent neural network trained for de-noising an input audio signal and implemented on the chip may result in power consumption no larger than 3 mW. In some embodiments, the number of operations per second required by a recurrent neural network trained for de-noising an input audio signal and implemented on the chip may result in power consumption no larger than 4 mW. Thus, in some embodiments, when running a recurrent neural network trained for denoising an input audio signal, the chip may consume no more than 2 mW. In some embodiments, when running the recurrent neural network, the chip may consume no more than 3 mW. In some embodiments, when running the recurrent neural network, the chip may consume no more than 4 mW. When there are 16 tiles and 64 MACs per tile and a clock frequency of 50 MHz, each of the 16 tiles may perform 64 multiply and accumulates in a single cycle, so the maximum OpsPerSecond may be 64*2*16*50e6→102.4 GOPs/Sec. As referred to herein, a multiply and accumulate is considered 2 operations. It should be appreciated that the total latency between when audio is received by the car-worn device and when the device outputs the processed audio may include a latency due to sampling audio for a certain length of time in addition to the chip's computational latency. For example, if the sampling window is tsample and the chip's latency for processing that audio sample is tchip, the total latency may be tsample+tchip.

In some embodiments, all the memory on the chip together may have no more than approximately ~17 Mbits of memory for weights. In some embodiments, all the memory on the chip together may have no more than approximately ~20 Mbits of memory for weights. In some embodiments, all the memory on the chip together may have no more than approximately ~25 Mbits of memory for weights. In some embodiments, all the memory on the chip together may have no more than approximately ~30 Mbits of memory for weights. In some embodiments, all the memory on the chip together may have no more than approximately ~40 Mbits of memory for weights.

In some embodiments, all the memory on the chip together may have more than approximately ~1 Mbits of memory for weights. In some embodiments, all the memory on the chip together may have more than approximately ~4 Mbits of memory for weights. In some embodiments, all the memory on the chip together may have more than approximately ~8 Mbits of memory for weights. In some embodiments, all the memory on the chip together may have more than approximately ~12 Mbits of memory for weights.

In some embodiments, the chip is approximately equal to or between 9-14 mm^2 in area. In some embodiments, the chip is approximately equal to or between 9-10 mm^2 in area. In some embodiments, the chip is approximately equal to or between 10-11 mm^2 in area. In some embodiments, the chip is approximately equal to or between 11-12 mm^2 in area. In some embodiments, the chip is approximately equal to or between 12-13 mm^2 in area. In some embodiments, the chip is approximately equal to or between 13-14 mm^2 in area. In such embodiments, the technology process node may be 12 nm, 7 nm, 5 nm, or 3 nm.

In some embodiments, the chip is approximately equal to or between 5-8 mm^2 in area. In some embodiments, the chip is approximately equal to or between 8-10 mm^2 in area. In such embodiments, the technology process node may be 7 nm, 5 nm, or 3 nm. In some embodiments, the chip is approximately equal to or between 6-8 mm^2 in area. In such embodiments, the technology process node may be 5 nm or 3 nm. In some embodiments, the chip is approximately equal to or between 5-6 mm^2 in area. In such embodiments, the technology process node may be 3 nm. In some embodiments, the chip is approximately equal to or less than 20 mm^2 in area.

In some embodiments, the car-worn device includes any suitable car-worn device such as, for example, a hearing aid, a pair of hearing aids, a headphone, a pair of headphones, face-worn glasses, a cochlear implant, or any other suitable ear-worn device. Examples of an car-worn device are described in U.S. Patent App. Pub. No. US20230232169A1, titled "Method, Apparatus and System for Neural Network Hearing Aid," published on Jul. 20, 2023 and based on an application filed on Jan. 14, 2022, which is incorporated by reference herein in its entirety. In some embodiments, the car-worn device includes components such as, for example, a neural network chip, a digital signal processing circuit (DSP) chip, one or more microphone(s), and one or more output signal generator(s). In some embodiments, the neural network chip described herein could be an implementation of the neural network engine (NNE) circuitry 150, NNE 350, NNE 450, NNE circuitry 510, NNE circuitry 550 shown in FIGS. 1, 3A, 4, 5A, and 5B of U.S. Patent App. Pub. No. US20230232169A1, respectively.

Figure 7:
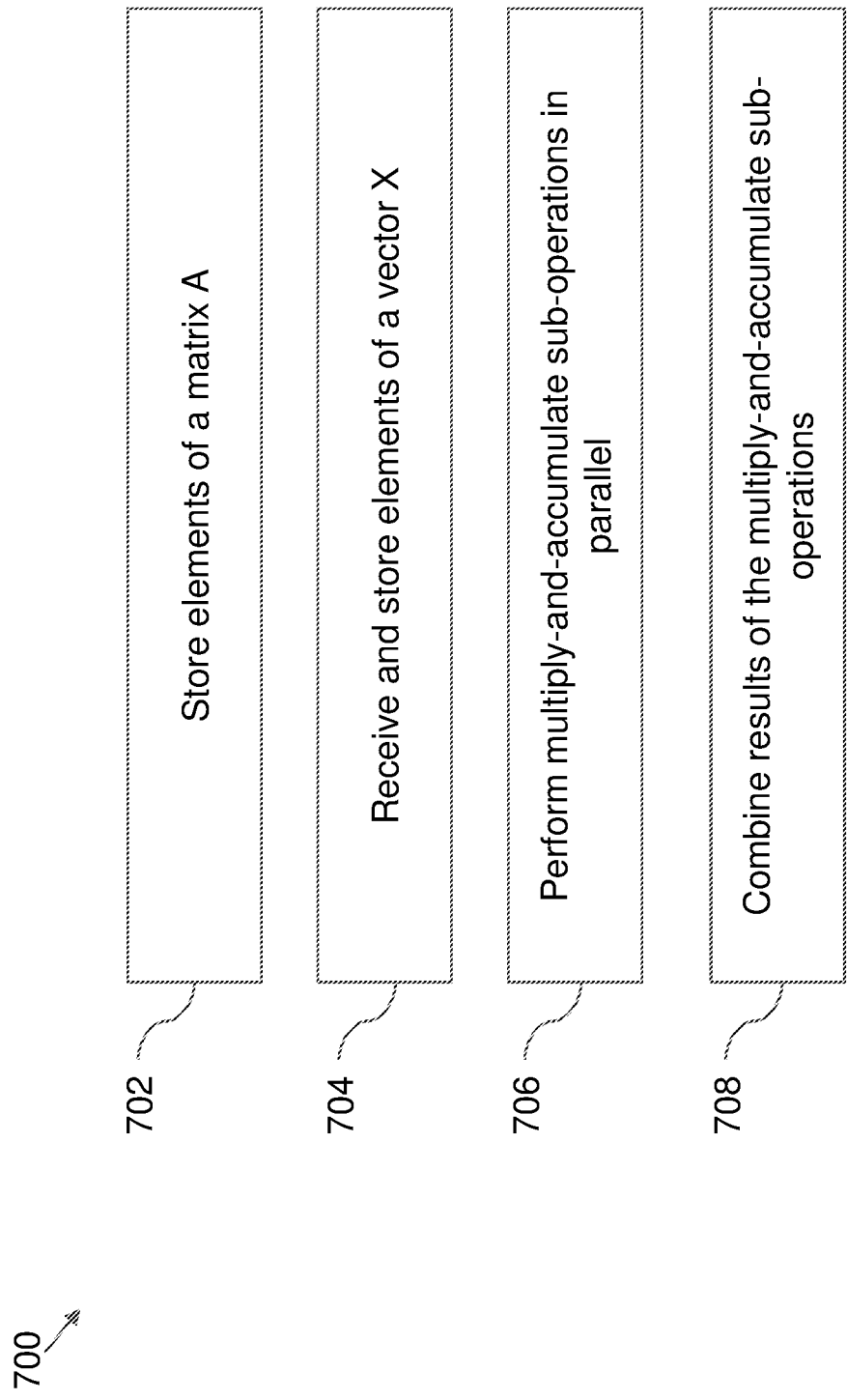
FIG. 7 illustrates a process for operating a neural network on a neural network chip, in accordance with certain embodiments described herein.

FIG. 7 illustrates a process 700 for operating a neural network on a neural network chip, in accordance with certain embodiments described herein. The process 700 is performed by a neural network chip (e.g., the neural network chips 326 and/or 626). The neural network chip may include a plurality of tiles (e.g., the tiles 100) arranged in a tile array (e.g., the tile array 316). Each tile may include memory (e.g., the memory 128), multiplier-accumulator circuits (MACs) (e.g., the MAX circuits 106), and routing circuitry (e.g., the routing circuitry 108). The neural network chip may be configured to implement a recurrent neural network.

At step 702, the neural network chip stores elements of a matrix A. For example, the memory of each tile may be configured to store a portion of the elements of the matrix A. The elements of the matrix A may be weights of a recurrent neural network.

At step 704, the neural network chip receives and stores elements of a vector X. For example, each tile may be configured to receive and store elements of the vector X. The vector X may be an activation vector derived from an input audio signal to the hearing aid. In some embodiments, all tiles in a column of the tile array may be configured to receive the same elements of the vector X.

At step 706, the neural network chip performs multiply-and-accumulate sub-operations in parallel. In some embodiments, all or a subset of the tiles may be configured to perform a matrix-vector multiplication A*X by performing the multiply-and-accumulate sub-operations in parallel.

At step 708, the neural network chip combines results of the multiply-and-accumulate sub-operations. For example, the routing circuitry from the tiles in each respective row of tiles may be configured to combine results of the multiply-and-accumulate sub-operations from the tiles in the respective row.

Further description of the neural network chip may be found above with reference to FIGS. 1-6. As further described above, when running the recurrent neural network, the neural network chip may be configured to achieve at least 4 GOPs/mW of power efficiency when operating at 100 GOPs/sec and when the recurrent neural network comprises up to 10M 8-bit weights.

Figure 8:
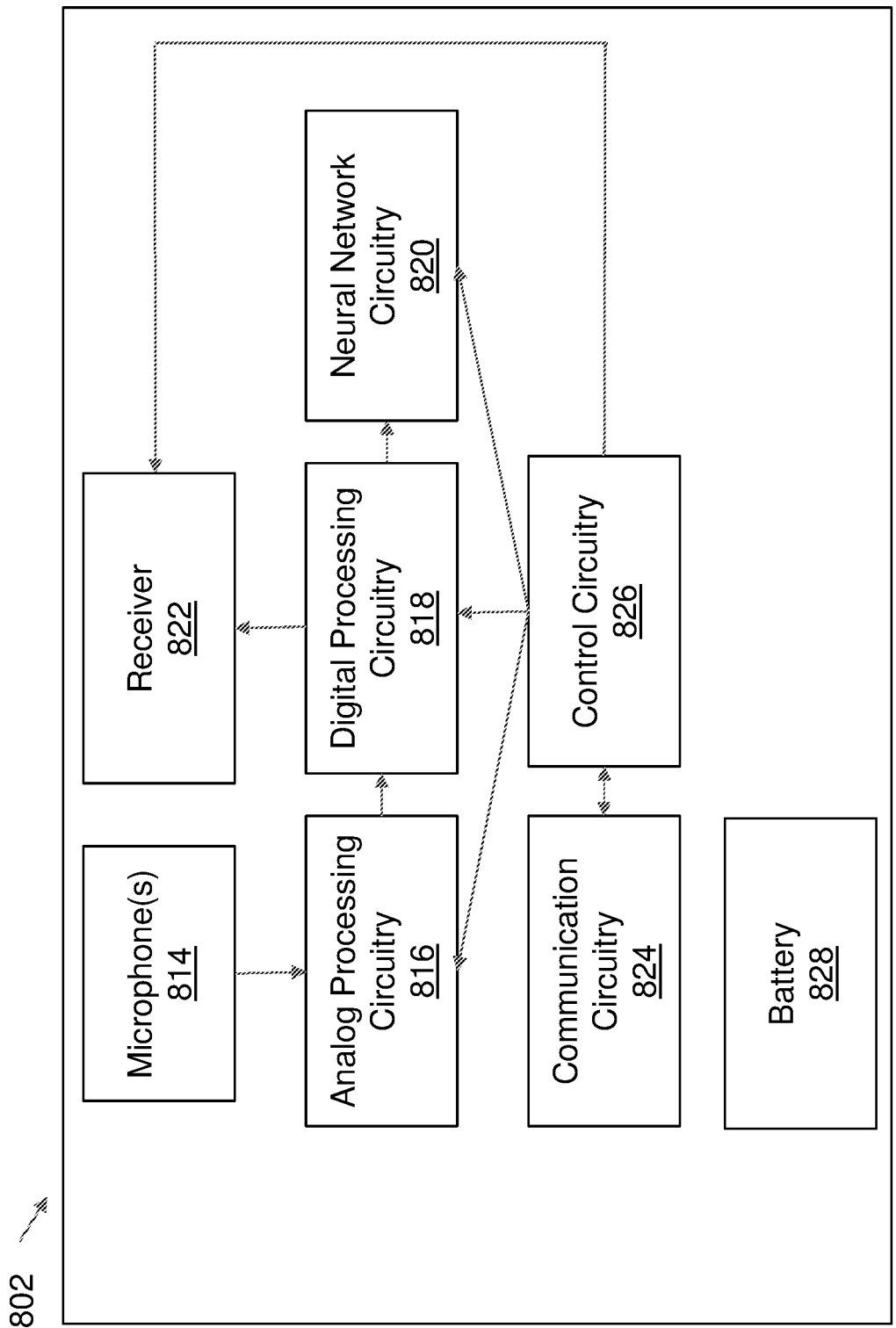
FIG. 8 illustrates a block diagram of an ear-worn device, in accordance with certain embodiments described herein.

FIG. 8 illustrates a block diagram of an car-worn device 802, in accordance with certain embodiments described herein. The car-worn device 802 may be any type of car-worn device (e.g., a hearing aid, cochlear implant, carphone, etc.) and may be any of such car-worn devices described herein. The car-worn device 802 includes one or more microphones 814, analog processing circuitry 816, digital processing circuitry 818, neural network circuitry 820, a receiver 822, communication circuitry 824, control circuitry 826, and a battery 828. It should be appreciated that the car-worn device 802 may include more elements than illustrated.

The one or more microphones 814 may be configured to receive sound and convert the sound to analog electrical signals. The analog processing circuitry 816 may be configured to receive the analog electrical signals representing the sound and perform various analog processing on them, such as preamplification, filtering, and analog-to-digital conversion, resulting in digital signals. The digital processing circuitry 818 may be configured to receive the digital signals from the analog processing circuitry 816 and perform various digital processing on them, such as wind reduction, beamforming, anti-feedback processing, Fourier transformation, input calibration, wide-dynamic range compression, output calibration, and inverse Fourier transformation.

The neural network circuitry 820 may be configured to receive the digital signals from the digital processing circuitry 818 and process the signals with a neural network to perform denoising (e.g., separation of speech from noise into separate subsignals) as described above. While the neural network circuitry 820 may receive audio signals that have been processed (e.g., by the analog processing circuitry 816 and the digital processing circuitry 818) subsequent to their reception by the one or more microphones 814, this may still be referred to herein as the neural network circuitry 820 denoising audio signals received by the one or more microphones 814. The outputs of the neural network circuitry 820 may be routed back to the digital processing circuitry 818 for further processing. The receiver 822 may be configured to receive the final audio signals and output them as sound to the user.

In some embodiments, the analog processing circuitry 816 may be implemented on a single chip (i.e., a single semiconductor die or substrate). In some embodiments, the digital processing circuitry 818 may be implemented on a single chip. In some embodiments, the neural network circuitry 820 may be implemented on a single chip. In some embodiments, the analog processing circuitry 816 (or a portion thereof) and the digital processing circuitry 818 (or a portion thereof) may be implemented on a single chip. In some embodiments, the digital processing circuitry 818 (or a portion thereof) and the neural network circuitry 820 (or a portion thereof) may be implemented on a single chip. In some embodiments, the analog processing circuitry 816 (or a portion thereof), the digital processing circuitry 818 (or a portion thereof), and the neural network circuitry 820 (or a portion thereof) may be implemented on a single chip. In some embodiments, denoised signals output by the neural network circuitry 820 on one chip may be routed to a different chip (e.g., a chip including digital processing circuitry 818 and/or analog processing circuitry 816) which may then route them to the receiver 822 for output to the user. In some embodiments, the receiver 822 may be incorporated into a chip also incorporating some or all of the analog processing circuitry 816, the digital processing circuitry 818, and the neural network circuitry 820. All the chips described herein may be in the car-worn device 802.

The neural network circuitry 820 may be implemented on any of the neural network chips described herein (e.g., the neural network chips 326 and/or 626). The neural network circuitry 820 may include any or all of the circuitry illustrated in FIGS. 1-6.

The communication circuitry 824 may be configured to communicate with other devices over wireless connections, such as Bluetooth, WiFi, LTE, or NFMI connections. The control circuitry 826 may be configured to control operation of the analog processing circuitry 816, the digital processing circuitry 818, the neural network circuitry 820, the communication circuitry 824, and the receiver 822.

Having described several embodiments of the techniques in detail, various modifications and improvements will readily occur to those skilled in the art. Such modifications and improvements are intended to be within the spirit and scope of the invention. Accordingly, the foregoing description is by way of example only, and is not intended as limiting. For example, any components described above may comprise hardware, software or a combination of hardware and software.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described above several aspects of at least one embodiment, it is to be appreciated various alterations, modifications, and improvements will readily occur to those skilled in the art. Such alterations, modifications, and improvements are intended to be objects of this disclosure. Accordingly, the foregoing description and drawings are by way of example only.

The invention claimed is:

1. A neural network chip, comprising:
   a plurality of tiles arranged in a tile array, each tile comprising memory, a number of multiplier-accumulator circuits (MACs) in a range of 16-128 MACs, and routing circuitry;
   wherein:
      the memory of each tile is configured to store a portion of elements of a matrix A comprising weights of a recurrent neural network;
      each tile is configured to receive and store elements of an activation vector X, wherein the activation vector X is derived from an input signal;
      all or a subset of the plurality of tiles are configured to perform a matrix-vector multiplication A*X by performing multiply-and-accumulate sub-operations in parallel among all or the subset of the plurality of tiles;
      routing circuitries of tiles in each respective row of tiles in the tile array are configured to combine results of the multiply-and-accumulate sub-operations; and
      all tiles in a column of the tile array are configured to receive same elements of the activation vector X.

2. The neural network chip of claim 1, wherein the memory and the MACs of any given tile are disposed within an area no larger than 0.25 mm^2.

3. The neural network chip of claim 1, wherein a tile of the plurality of tiles is configured to reuse an element of the activation vector X across all calculations performed by the MACs in the tile on a given clock cycle.

4. The neural network chip of claim 1, wherein a tile of the plurality of tiles is configured to simultaneously fan out a single element of the activation vector X from the memory to each of the MACs in the tile.

5. The neural network chip of claim 1, wherein all tiles in a column of the tile array are coupled to a vector memory only by a single, shared bus.

6. The neural network chip of claim 1, wherein the tile array lacks independent connections between adjacent tiles in a column of the tile array.

7. The neural network chip of claim 6, wherein a tile in the column lacks capability to output data to another tile in the column.

8. The neural network chip of claim 1, wherein the neural network chip lacks capability to transmit different elements of the activation vector X to different tiles in a column.

9. The neural network chip of claim 1, wherein all memory on the neural network chip together comprises no more than approximately 40 Mbits of memory for the weights of the recurrent neural network.

10. The neural network chip of claim 1, wherein an area of the neural network chip is in a range of approximately 9 mm^2 to approximately 14 mm^2.

11. The neural network chip of claim 1, wherein the neural network chip is approximately equal to or less than 20 mm^2 in area.

12. The neural network chip of claim 1, wherein:
   the neural network chip further comprises a plurality of bias circuits, each bias circuit electrically coupled with one row of the plurality of tiles in the tile array and comprising bias memory and routing circuitry;
   each bias circuit of the plurality of bias circuits is configured to receive and store one or more biases in the bias memory; and
   routing circuitries of tiles in a respective row of tiles in the tile array and routing circuitry of a bias circuit electrically coupled with the respective row of tiles are configured to combine the results of the multiply-and-accumulate sub-operations with the one or more biases.

13. The neural network chip of claim 1, wherein the neural network chip further comprises:
   short-time Fourier transform (STFT) circuitry and inverse short-time Fourier transform (ISTFT) circuitry configured to perform STFT on signals coming from off-chip and iSTFT on signals going off-chip, respectively.

14. The neural network chip of claim 13, wherein the activation vector X for a first layer of the recurrent neural network is a result of processing the input signal coming from off-chip with the STFT circuitry.

15. The neural network chip of claim 1, wherein the recurrent neural network is configured to perform de-noising of signals.

16. The neural network chip of claim 1, wherein the neural network chip is configured to disable a subset of the plurality of tiles within the tile array.

17. The neural network chip of claim 16, wherein the neural network chip is configured to disable the subset of the plurality of tiles within the tile array based on sizes of the matrix A and/or the activation vector X.

18. The neural network chip of claim 16, wherein the neural network chip is further configured to disable the subset of the plurality of tiles within the tile array when estimating a signal-to-noise ratio (SNR) of the input signal.

19. The neural network chip of claim 18, wherein the neural network chip is further configured to estimate the SNR of the input signal with one tile.

20. The neural network chip of claim 16, wherein the neural network chip is further configured to select the subset of the plurality of tiles within the tile array to disable based on a target amount of de-noising to be provided by the recurrent neural network.

\* \* \* \* \*